United States Patent [19]

Hwo et al.

[11] Patent Number: 5,073,458
[45] Date of Patent: Dec. 17, 1991

[54] POLYPROPYLENE-POLYBUTYLENE LAMINATED PACKAGING FILM WITH IMPROVED TEAR STRENGTH

[75] Inventors: Charles C. Hwo, Sugar Land, Tex.; Larry K. Watkins, Altamont, Ill.

[73] Assignee: Shell Oil Company, Houston, Tex.

[21] Appl. No.: 531,206

[22] Filed: May 31, 1990

[51] Int. Cl.$^5$ ............................................. B32B 27/00
[52] U.S. Cl. ..................................... 428/516; 428/349
[58] Field of Search ......................... 428/349, 516, 335

[56] References Cited

U.S. PATENT DOCUMENTS

| | | | |
|---|---|---|---|
| T955,009 | 2/1977 | Lansbury et al. | 428/515 |
| 3,972,964 | 8/1976 | Doentremont | 260/897 |
| 4,125,662 | 11/1978 | Weiner et al. | 428/213 |
| 4,275,120 | 6/1981 | Weiner et al. | 428/516 |
| 4,339,493 | 7/1982 | Weiner et al. | 428/349 |
| 4,339,494 | 7/1982 | Weiner et al. | 428/349 |
| 4,339,495 | 7/1982 | Weiner et al. | 428/349 |
| 4,339,496 | 7/1982 | Weiner et al. | 428/349 |
| 4,340,640 | 7/1982 | Weiner et al. | 428/349 |
| 4,340,641 | 7/1982 | Weiner et al. | 428/349 |

FOREIGN PATENT DOCUMENTS 1570353 5/1965 Fed. Rep. of Germany .
2098542 11/1982 United Kingdom .

Primary Examiner—Edith L. Buffalow

[57] ABSTRACT

A packaging film composition having an improved tear strength comprising a core, which is preferably polybutylene homopolymer or copolymer or a blend of polybutylene with another compatible polymer, said core being coated on one or both sides with a polypropylene homopolymer or copolymer optionally blended with a minor amount of a high melt index polybutylene.

1 Claim, No Drawings

POLYPROPYLENE-POLYBUTYLENE LAMINATED PACKAGING FILM WITH IMPROVED TEAR STRENGTH

BACKGROUND OF THE INVENTION

1. Field of the Invention

The invention relates to a multi-layer, thermoplastic heat-sealable film suitable for conventional packaging applications.

2. Brief Description of the Prior Art

Oriented polypropylene film has become a useful and widely accepted packaging film because of its good moisture barrier, stiffness, high strength, and good optical properties. However, the tear strength of polypropylene films is relatively low and improvement has long been needed. Polybutylene films are known to give the strongest tear strength among the unsubstituted polyalphaolefins. However, blending polybutylene into polypropylene cannot improve the tear strength of polypropylene significantly. The tear strength of polypropylene may, however, be significantly improved by coextruding polybutylene. The processability of a polypropylene/polybutylene structure film is rather poor if the polybutylene is used as a surface layer, due to the sticky nature of polybutylene just prepared from the melt. By sandwiching polybutylene as a core layer, the sticky problem is then eliminated. Adding a small amount of high melt index polybutylene in the polypropylene layers further improves the processability and optics of the laminated films.

U.S. Pat. No. 3,972,964 issued to D. J. Doentremont, discloses a coating composition for heat-shrinkable thermoplastic film comprising blends of polybutene-1 with ethylene-propylene copolymer to provide abuse resistance with reduced tackiness without compromising the orientability of the base film. However, in order to achieve this objective Doentremont specifies that the coating composition must have a polybutene-1 constituent in the range of 5%–40% by weight and that it is undesirable to have more than 40% polybutene-1. Such a coating composition, while achieving the objectives of abuse resistance and reduced tackiness, does not impart good heat sealability to the film.

U.S. Defensive Publication No. T-955,009 (R. C. Lansbury and T. G. Heggs, Feb. 1, 1977) addresses the problem of heat sealability directly. Lansbury and Heggs have found that they can improve the sealability of polypropylene film by coextruding the polypropylene substrate with a coating composition comprising a blend of 10%–59% (by weight) ethylene-propylene copolymer with 41%–90% (by weight) of a homo- or copolymer of a $C_4$ to $C_{10}$ alpha-olefin to a polypropylene core with a thin coating of such composition on one or both sides.

U.S. Pat. Nos. 4,125,662; 4,275,120; 4,340,060; 4,340,641; 4,339,493; 4,339,494; 4,339,495; and 4,339,496 disclose laminated films having a polypropylene core and polybutylene outer layers.

SUMMARY OF THE INVENTION

The present invention is a novel multi-layer film composition having an unexpectedly high tear strength and good processability. The film comprises a "core" or substrate of butylene homopolymer or copolymer or blends of two butene-1 polymers or blends of butene-1 polymer with propylene homopolymers and copolymers. This core is coated on one or both sides with a layer of propylene homopolymer, or copolymer, the coating forming a "skin" which may comprise from 3% to 30% of the total thickness of the coated film.

The film may be made by any conventional technique in which a skin layer, which is substantially polypropylene or an ethylene-propylene copolymer, may be applied to a core or base layer consisting substantially of polybutylene. Any of the known methods of coextrusion or of extrusion coating can be used to make this film.

The film-forming composition, or any component thereof, can be used unaltered or can be modified with additives for improvement of slip, antiblock or static properties of the finished film.

DESCRIPTION OF THE PREFERRED EMBODIMENT

The coated thermoplastic film of the present invention may be formed by an conventional technique for producing a multi-layered film, for example: coextrusion, lamination of previously extruded films, extrusion coating., emulsion coating; and so forth. The preferred method is coextrusion, but it is not our intention to limit the means of production to any single technique.

Resins useful for the core layers of the present invention include low melt index homopolymers of butene-1 and copolymers of ethylene with butene-1 wherein the ethylene content is between 0.25% and 10% by weight. The outer skin material may be any homopolymer of propylene, or a copolymer of propylene with ethylene or with butene-1, or it may comprise a blend of propylene homopolymer or copolymer with any compatible polymeric substance. For most applications it is preferred that the outer layer be substantially polypropylene.

The outer layer may also be a blend of polypropylene and a high melt index polybutylene.

The high melt index poly-1-butene referred to herein is a butene-1 polymer containing at least about 90%, preferably at least about 95%, and more preferably about 97%, by weight of isotactic portions. Useful in the present invention are isotactic poly-1-butenes having a low molecular weight, e.g. less than about 280,000 as determined by solution viscosity in "Decalin" (decahydronophthalene). Usable poly-1-butenes have a density of 0.900–0.925, preferably 0.905–0.920 and especially 0.910–0.915. Usable poly-1-butenes have melt indices in the range of from 10 to 1000, more preferably 20–650, and most preferably 100–500, as determined by ASTM D-1238 Condition E, at 190° C. The intrinsic viscosity of the polybutylene may range from about 0.03 to about 0.20 preferably from about 0.06 to about 0.11 at 130° C.

The low melt index butene-1 polymers referred to herein are substantially polybutene-1 containing at least 95%, preferably 97%, and most preferably 98% by weight of isotactic portions. Suitable polybutenes have a density of 0.914–0.919 and a melt index of less than 20 g/10 min. at 190° C.

Suitable polybutenes can be obtained, for example, according to Ziegler-Natta low pressure polymerization of butene-1 ad disclosed in German Published Application No. 1,570,353.

The butene-1 polymers (PB) usable herein are either butene-1 homopolymers or copolymers. If butene-1 copolymers are used, the non-butene comonomer content is preferably 1–30 mole % of either ethylene, propylene, or an alpha olefin having from 5 to 8 carbon atoms.

Suitable poly-1-butenes can be obtained, for example, in accordance with Ziegler-Natta low-pressure polymerization of butene-1, e.g. by polymerizing butene-1 with catalysts of $TiCl_3$ or $TiCl_3.AlCl_3$ and $Al(C_2H_5)_2Cl$ at temperatures of 10°–50° C., preferably 20°–40° C., e.g. according to the process of German Published Application No. 1,570,353. High melt indices are then obtained by further processing the polymer by peroxide cracking. The polybutylene may be modified to increase surface activity by reaction with, for example, maleic anhydride or other functional group.

The polypropylene used in the present invention is any crystallizable polypropylene. Said polypropylene can be prepared by homopolymerizing propylene irrespective of the method used so long as crystallizable polypropylene is formed. The preferred polypropylenes are the substantially isotactic polypropylenes prepared by the Ziegler/Natta or $MgCl_2$-supported catalyst polymerization process.

The propylene polymers usable herein can be either propylene homopolymers or copolymers. If propylene copolymers are used, they can be random or block copolymers with the comomoner content preferably 1–30 mole % of either ethylene, butene, or an alpha olefin having from 5 to 8 carbon atoms.

Propylene polymers useful in the invention preferably have a melt index of less than 60, more preferably from about 1–15, as measured by ASTM D-1238, Condition L at 230° C. A particularly suitable propylene, has a melt index of 2.6 and is available from Shell Chemical Company, of Houston, Texas as PP5A08.

The laminate compositions may also contain additives and fillers, e.g. mold release agents, UV or thermal stabilizers, slip agents, antiblock agents, nucleating agents, pigments, antioxidants, or flame retardants.

Blending of the components can occur by one of several methods, dry tumble blending, masterbatch, or melt compounding techniques. The method of combining the ingredients of the formulation is important. For example, in most cases, it is desirable to use the least amount of energy to merge the components into an effective blend. Therefore, the preferred method of blending is dry blending the components in a powder form.

The skin layer of the laminate structure embodied herein is usually 0.1 mil to 0.8 mil for every mil of total film thickness. Generally preferred is a skin of 0.3 mil to 0.6 mil and a total film thickness of 0.9 mil to 2.0 mils.

EXAMPLES

Films may be prepared having a coating on either one or both sides of the core film. Films were prepared by coextruding a core material of polybutylene copolymer with a coating on both sides thereof comprising propylene homopolymer. The molten polymers were coextruded from a conventional extruder through a flat sheet die, the melt streams being combined in an adaptor prior to being extruded from the die. Each skin layer comprised approximately ⅛ of the total thickness of the film. The resin was extruded at about 204° C. (400° F.) for the skin material and 218° C. (425° F.) for the core material.

After leaving the die orifice, the coated films were quenched in a water bath at about 10° C. (50° F.). The quenched sheet was then reheated to about 93° C. (200° F.) and stretched 5X in the machine direction (MD) and subsequently about 7.5X in the transverse direction (TD). The high edges were trimmed off and the film wound on cores.

Using this same basic procedure, films were prepared having the following composition:

Film 1. PP5A08 polypropylene, single layer, 1.5 mils
Film 2. PP5A08/PB8640 polybutylene/PP5A08, 0.5 mil/0.5/mil/0.5 mil
Film 3. PP5A08/PB8640 (50%)+PB8310 polybutylene (50%)/PP5A08, 0.5 mil/0.5 mil/0.5 mil
Film 4. PP5A08+PB0800 polybutylene (5%)/PB8640 (50%)+PB8310 (50%)/PP5A08+PB0800 (5%) 0.5 mil/0.5 mil/0.5 mil The various materials used for the example films were as follows:

PP5A08 is a polypropylene homopolymer with a melt index of 2.8 g/10 min. at 230° C. density of 0.90, available from Shell Chemical Company, Houston, Texas.

PB8640 is a polybutylene copolymer with an ethylene comonomer content of 0.75% by weight, a melt index of 1.0 g/10 min. at 190° C. and a molecular weight of about 550,000, available from Shell Chemical Company, Houston, Texas.

PB8310 is a polybutylene copolymer with an ethylene comonomer content of 5.5% by weight, a melt index of 4.0 g/10 min. at 190° C., and a molecular weight of about 400,000, available from Shell Chemical Company, Houston, Texas.

DP0800 is a polybutylene homopolymer with a melt index of 200 g/10 min. at 190° C., molecular weight of 108,000, available from Shell Chemical Company, Houston, Texas.

The typical physical properties of the high melt index polybutylene (DP0800) are listed below.

TABLE I

| Typical Physical Properties of DP0800 Polybutylene | | | | |
|---|---|---|---|---|
| | ASTM | Unit | | Polybutylene |
| | Test Method | English | (Metric) | DP0800 |
| Melt Index @ 190° C. | D1238 "E" | — | g/10 min | 200 |
| @ 210° C. | D1238 "L" | — | g/10 min | 490 |
| Density | D1505 | lb/ft | g/cm³ | 57.1(0.915) |
| Tensile strength @ yield | D638 | psi | MPa | 2000(13.8) |
| Tensile strength @ break | D638 | psi | MPa | 4200(29.0) |
| Elongation at break | D638 | % | % | 350 |
| Modulus of elasticity | D638 | psi | MPa | 35000(241) |
| Hardness, Shore | D2240 | D scale | D scale | 55(55) |
| Brittleness temperature | D746 | °F. | °C | 0°(18°) |
| Melting point range | DSC | °F. | °C | 255–259° (124–126°) |
| Soft point, Vicat | D1525 | °F. | °C. | 241°(116°) |

TABLE I-continued

Typical Physical Properties of DP0800 Polybutylene

| | ASTM Test Method | Unit English | Unit (Metric) | Polybutylene DP0800 |
|---|---|---|---|---|
| Thermal conductivity, at 77° F. | C177 | Btu/ft$^2$/hr/°F./in | Kcal/m$^2$ hr/°C./cm | 1.25 (16) |

Table II shows the tear strength improvement obtained by laminating polybutylene or a polybutylene blend between polypropylene layers in Films 2 and 3. Also, Film 4 demonstrates that a small amount of high melt index polybutylene improves the optical properties while providing high tear strength and improved processability. Films having a polybutylene core and those containing a minor amount of high melt index polybutylene blended with polypropylene were processed very easily and had no handling problem since the surface was not tacky.

Table II

Tear Strength Improvement of Polypropylene Film
Film Thickness: 38 microns

| Sample I.D. | 1 | 2 | 3 | 4 |
|---|---|---|---|---|
| Haze, % | 9.7 | 12.2 | 11.7 | 11.2 |
| Clarity, % | 17.7 | 15.5 | 15.9 | 16.2 |
| Gloss (60°) | 78.7 | 76.4 | 75.3 | 78.7 |
| Tear Strength, G/Mil | | | | |

| Sample I.D. | 1 | 2 | 3 | 4 |
|---|---|---|---|---|
| MD | 8.3 | 30 | 48 | 23 |
| TD | 211 | 788 | 653 | 866 |

As can be seen from this data, the laminated films of the present invention, i.e. Films 2, 3, and 4 have a significantly higher tear strength than polypropylene alone (Film 1) while retaining the good optical properties and do not have problems associated with a tacky surface.

In addition, Film 4 which contained 5% by weight of a high melt index polybutylene in the outer layers, processed more easily with a lower back pressure and higher throughput rate.

What is claimed is:

1. A multiple-layer, heat-sealable laminated film comprising:
   (a) a core layer formed from a member of the group consisting of butene-1 homopolymers and copolymers of butene-1 with ethylene wherein the ethylene content is 0.25% to 15% by weight, and
   (b) on both sides of said core, a layer which is consisting essentially of a homopolymer or copolymer of propylene.

* * * * *